United States Patent [19]

Timblin

[11] Patent Number: 4,718,021

[45] Date of Patent: Jan. 5, 1988

[54] TECHNIQUE FOR FAN CYCLING TO MAINTAIN TEMPERATURE WITHIN PRESCRIBED LIMITS

[76] Inventor: Stanley W. Timblin, #4 Forest Hill Ct., Greensboro, N.C. 27410

[21] Appl. No.: 778,602

[22] Filed: Sep. 20, 1985

[51] Int. Cl.$^4$ .................. G06F 15/20; G06G 7/68; G05D 23/00; F24F 3/00

[52] U.S. Cl. .................. 364/505; 236/1 B; 236/46 R; 165/22

[58] Field of Search ............ 236/49, 46 R, 1 B; 165/12, 22; 364/505, 557

[56] References Cited

U.S. PATENT DOCUMENTS

| | | | |
|---|---|---|---|
| 4,071,745 | 1/1978 | Hall | 165/22 |
| 4,094,166 | 6/1978 | Jerles | 236/46 R |
| 4,243,174 | 1/1981 | Moeller et al. | 236/46 R |
| 4,298,163 | 11/1981 | Richardson et al. | 236/46 R |
| 4,393,662 | 7/1983 | Dirth | 236/1 B |
| 4,453,590 | 6/1984 | Holliday et al. | 236/46 R |
| 4,473,183 | 9/1984 | Kensinger et al. | 236/46 R |
| 4,487,363 | 12/1984 | Parker et al. | 165/22 |
| 4,602,668 | 11/1986 | Adams | 236/46 R |

*Primary Examiner*—Errol A. Krass
*Assistant Examiner*—Danielle Laibowitz
*Attorney, Agent, or Firm*—Charles R. Rhodes; Judith E. Garmon

[57] ABSTRACT

The temperature of a serviced area or zone is cost efficiently maintained within a prescribed range by establishing a prescribed fan cycle period, during which period the fan is both operative and non-operative at variable intervals. The temperature of the serviced area is monitored and averaged for each given cycle. The fan run time is then determined by a CPU for the succeeding cycle dependent upon the difference between the average measured temperature and a prescribed balance temperature.

8 Claims, 2 Drawing Figures

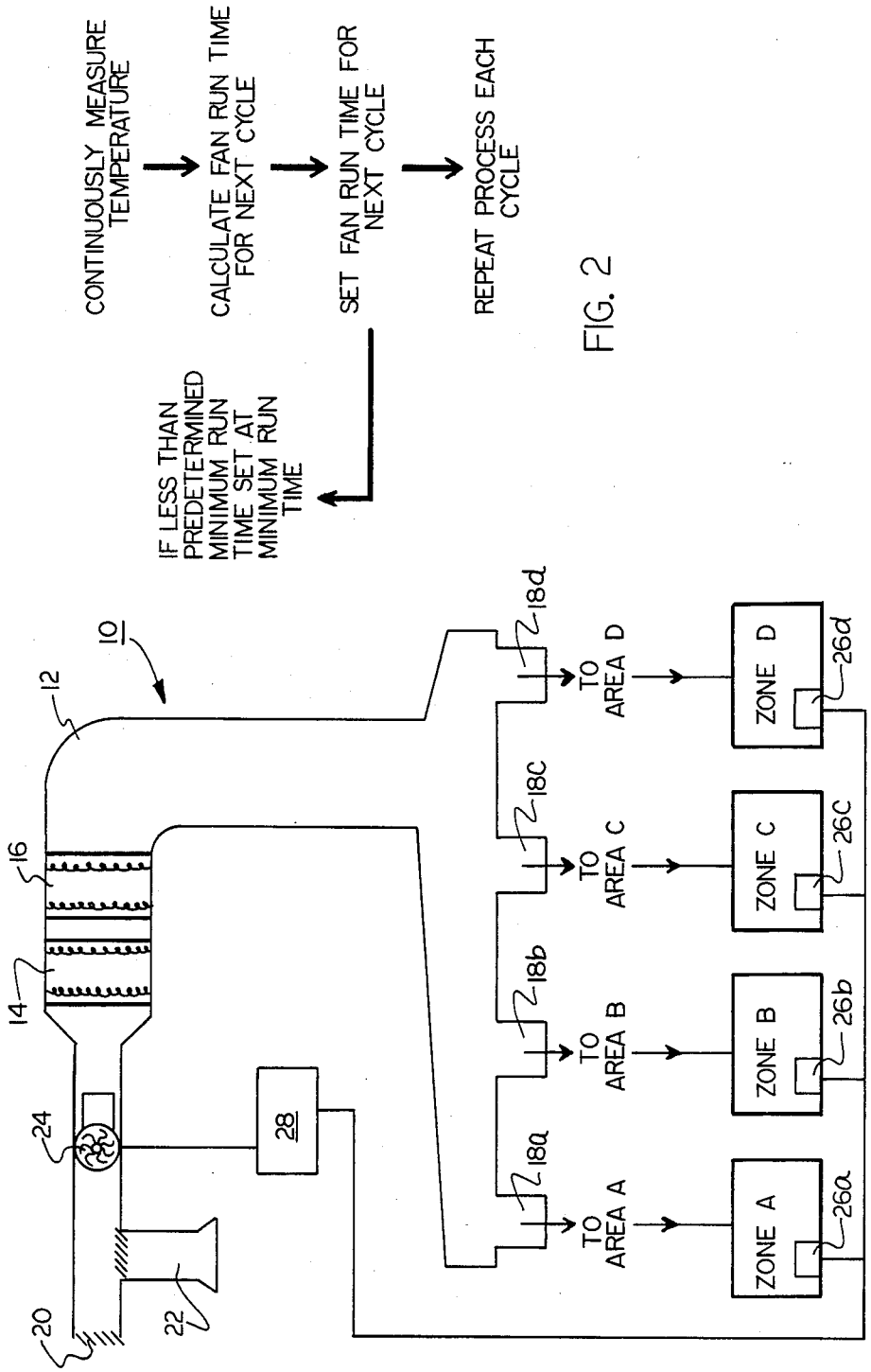

TECHNIQUE FOR FAN CYCLING TO MAINTAIN TEMPERATURE WITHIN PRESCRIBED LIMITS

BACKGROUND AND SUMMARY OF THE PRESENT INVENTION

This invention relates to temperature control techniques and more specifically to a technique for controlling the temperature within a serviced area or zone by variably adjusting the run time of a fan during successive fan cycles.

The control of temperature within a prescribed or serviced area, such as a work area, an office area, a school room, or an area of the home, has long been a desired goal of the heating and air conditioning industry. In particular, it is desired to achieve this goal in a manner which is cost efficient, and yet maintains the temperature within comfortable limits for an extended period of time.

The most primitive type of temperature control within a serviced area is an ON-OFF switch. When the occupant is too warm or too cool, the switch is turned on to provide cool or heated air, whichever is desired. The next step in the development of the art is the use of a thermostat, which in actuality, senses the temperature in the serviced area and automatically turns the aforementioned switch on or off, which ever is needed. While this approach achieves a desired temperature level, it is not very cost efficient, because whenever a temperature varies slightly, the fan and heat exchanger or cooling coils are activated until the target temperature is met.

A further approach is to operate the fan continuously, but vary the temperature of the heat exchanger. Varying the temperature of the heat exchanger is accomplished by cycling the run time of the compressor or varying the volume of the heating or cooling medium. Such is an expensive undertaking and difficult to achieve consistently.

Another technique for controlling the temperature in a serviced area is by throttling the air volume (as by dampers) delivered to the serviced zone or throttling the air volume delivered to the main fan. These techniques generally result in an undesirable situation because the balance within the overall HVAC system is disrupted, and thus it is difficult to achieve proper control.

In the present invention, on the other hand, control of the temperature in the serviced zone is maintained within desired limits by establishing computer controlled time periods or cycles in which the fan is operative part of the time and inoperative part of the time. The relative time in each period during which the fan runs may vary depending on the measured conditions in the previous cycle. The amount of time the fan is operated per cycle is determined by measuring the temperature during the previous cycle. The difference between the average measured temperature and a prescribed "balance temperature" determines how long the fan operates during the next cycle. The "balance temperature" is a prescribed temperature toward which the system is aiming to achieve a comfortable continuous environment. The measuring and adjusting is repeated each cycle, so that the fan run time for each cycle is determined and the temperature is actually modulated toward the prescribed limit.

The primary advantage of this approach is to maximize the need at a minimum cost. As additional capacity is needed (for example as when it gets hotter outside) the run time of the fan increases. Conversely, as the capacity needs are diminished the run time decreases.

Another advantage of the present invention lies in the fact that it is possible to maintain a constant volume of air flow through the duct system while maintaining an air distribution balance. Further, in systems which require some ventilation, whether or not heating or cooling is needed, the invention guarantees a minimum run time of the fan every cycle, even while the temperature is remaining close to the prescribed limit.

More particularly, the technique according to the present invention accomplishes a control of the temperature in the served zone by operating the fan in cycles of predetermined time span, wherein the length of time in each cycle in which fan is operated is variably controlled responsive to fluctuations in the difference between the actual temperature and the zone being serviced and a "balance temperature." In effecting this result, the technique envisions setting prescribed cycle periods of a time duration during which the fan is operative and inoperative. A prescribed balance temperature for the zone to be served by the equipment is determined. During each cycle, the temperature in the zone is continuously or intermittently measured. The average measured temperature is compared with the balance temperature being worked toward, then the fan run time for the next cycle is calculated according to a prescribed formula responsive to the measured difference. For example, during summertime operation the fan may be set to run a minimum of six out of every fifteen minutes. If during a fifteen minute cycle when the temperature measurement is made, and it is determined that the average temperature is too high (moving away from the balance temperature), then the fan run time for the next cycle is increased. During the next cycle the measurement is again made and adjusted responsive to the difference between the actual average temperature and the balance temperature being worked toward. In wintertime operation, the procedure works exactly oppositely.

It is therefore an object of the present invention to provide a temperature control technique which maximizes the need at a minimum cost.

It is another object of the present invention to provide a temperature control technique of the type described in which the main fan run time for successive cycles varies responsive to the difference between the actual average temperature in the zone to be treated and a balance temperature during the previous cycle.

Other objects and a fuller understanding of the invention will become apparent upon reading the following detailed description of a preferred embodiment along with the accompanying drawings in which:

FIG. 1 is a schematic representation of an HVAC system according to the present invention; and FIG. 2 is a process chart showing the steps in the process of the present invention.

DETAILED DESCRIPTION OF A PREFERRED EMBODIMENT

Turning now to a description of a preferred embodiment, there is illustrated in FIG. 1 a conventional HVAC system 10 with which the present invention is adapted for use. First of all, conventional HVAC systems 10 include a duct system 12 through which air is circulated to one or more zones (designated as zone A, zone B, etc.). The duct system is provided near the front end with a cooling coil 14 and/or heating coil 16. It should be noted here that the cooling coil 14 could be replaced with an air washer whereby the cooling is effected by water spray.

Once the air is brought to the desired temperature, it is circulated through the duct 12 to branch conduits 18a–18d through which the air is delivered to the work zones A–D. A return air duct 22 receives air from the treatment zones and returns it into the duct system 12. Also, outside or fresh air 20 may be introduced to the duct 12. The return air and supply air may be used separately or in combination according to conventional techniques otherwise utilized in the prior art. The selection of return air or outside air or combinations thereof is not a part of the present invention and no further reference will be made thereto.

A fan 24 draws air through the return duct 22 and outside air duct 20 and causes the air to be moved through the duct system 12 in accordance with conventional techniques. In the present invention it is the control of the variable run time of this fan 24 which is addressed. Toward this end, each of the zones A–D are supplied with a temperature sensing means 26a–26d such as a thermostat. Signals indicative of the temperature of zones A–D are delivered from the temperature sensing means 26a–26d to a microprocessor unit 28.

In the CPU the information from temperature sensors 26a–26d are received, averaged, and compared with a prescribed balance temperature. The determination is made thereby for the fan run time for the succeeding cycle by computing the aforesaid values according to a prescribed formula. This is the heart of the present invention.

In FIG. 2, there is illustrated the process steps according to the present invention which includes: (1) continuously providing information from sensors 26a–26d as to the temperature of each zone; (2) averaging the temperatures during each cycle; (3) comparing the average temperatures with preset range limits; (4) determining the fan run time for the next cycle responsive to the difference in the average temperature and the range limits; (5) setting the fan run time for the next cycle; and (6) repeating the above for each cycle.

The cycles or periods may vary depending upon the particular work environment addressed. Exemplary cycle periods may be fifteen minutes or thirty minutes; however, other periods may also be utilized. Once the cycle time is selected, then the temperature range limits are selected. For example, in a summertime operation, it may be desired that the fan run for only a portion of a cycle until the temperature reaches 78°. At temperatures of 78° and above, an override control will cause the fan to continuously through each cycle until the temperature is reduced below the 78° limit. This is referred to as the "high temperature limit." A balance temperature should be set to establish a temperature which the system strives to reach. For example, this could be 68°. At temperatures between 68° and 78° then, the fan will be run for various time intervals up to fifteen minutes. Generally, there will preferably be some type of minimum run time on the order of six minutes to ensure that fresh air is continuously supplied to the work area.

Thus, the formula for the fan run time for a succeeding cycle in a cooling mode will be determined from the preceding cycle by the following formula:

$$RT_{x+1} = (T_x - T_b) \times \frac{IN_x}{T_h - T_b}$$

where
$RT_{x+1}$ = the run time for the succeeding cycle.
$T_x$ = average temperature of the current cycle.
$T_b$ = the prescribed balance temperature.
$IN_x$ = the selected cycle interval.
$T_h$ = the high temperature limit.

In utilizing this formula, if in a current fifteen minute time interval, the average temperature of the current cycle is 75°; the high temperature limit is 78° and the balance temperature is 68°, then in applying the formula the run time for the succeeding cycle would be $(75-68) \times 15/78-68$ or ten and one-half minutes. Note that in temperatures below 72°, where a six minute minimum run time had been selected, the six minute minimum time would override whatever run time was calculated by the formula.

It should be also noted that the formula could be so arranged that the fan run time were varied in a heating mode also. In such case, the balance temperature would be the higher temperature and the lower temperature limit would replace the high temperature limit in the formula. Rather than basing calculations on an average cycle temperature, a single temperature at a prescribed time in each cycle could be the basis for the calculations. Also, utilizing a central processing unit, rather than the above formula, a look up schedule in the computer memor could be utilized to vary the fan run time for a succeeding cycle rather than the above formula. Whether the run time is varied according to a formula or according to a schedule both are envisioned by the present invention. The important thing is that the fan run time of a succeeding cycle is determined responsive to the difference between the average temperature of a preceding cycle and the balance temperature being strived for.

While a preferred embodiment of the invention has been described in detail hereinabove, it is apparent that various changes and modifications might be made without departing from the scope of the present invention which is set forth in the accompanying claims.

What is claimed is:

1. Method for maintaining the temperature of a served zone within prescribed limits with HVAC equipment of the type includng a supply fan which provides air into a set of cooling/heating coils or an air washer wherein a prescribed balance temperature is set; the fan is operated in cycles of predetermined time span in which the fan is run part of the time and idle part of the time; the actual temperature in said served zone is sensed for a current cycle and delivered to a data processing unit; and the fan run time in each succeeding cycle during which said fan is operated is selectively controlled by said data processing unit in direct proportion to the difference between said actual temperature in the served zone for said current cycle and said prescribed balance temperature.

2. The method according to claim 1 wherein the fan run time for a succeeding cycle is determined according to the following formula:

$$RT_{x+1} = (T_x - T_b) \times \frac{IN_x}{T_h - T_b}$$

where
- $RT_{x+1}$ = the run time for the succeeding cycle.
- $T_x$ = actual temperature of the current cycle.
- $T_b$ = the prescribed balance temperature.
- $IN_x$ = the selected cycle interval.
- $T_h$ = the high temperature limit.

3. The method according to claim 2 wherein the fan run times for succeeding cycles are predetermined by assuming various actual temperature values, solving substantially in accordance with said formula, and storing said actual temperature values and fan run times for succeeding cycles in a look-up schedule associated with said data processing unit, and said fan run times are then controlled by delivering said sensed actual temperature to said data processing unit from which the succeeding cycle fan run time is obtained.

4. The method according to claim 1 in which said served zone comprises a plurality of separate zones all served by the same supply fan and said actual temperature in the served zones is the average sensed actual temperature from each of said plurality of separate zones.

5. Method for maintaining the temperature of a serviced zone within prescribed limits with HVAC equipment of the type including an air supply fan which provides a controlled, variable air input to a set of cooling/heating coils or to an air washer comprising the steps of:

(a) setting prescribed cycle periods within which periods said fan is operative and inoperative, said cycle periods having a minimum fan run time to maintain fresh air within said serviced zone;

(b) setting a prescribed limit temperature and a balance temperature for a served by the HVAC system;

(c) measuring the average temperature in said zone during a prescribed current cycle to determine an actual temperature for said current cycle;

(d) comparing said actual temperature in said current cycle with said balance temperature; and, automatically adjusting by a computer the amount of time during the succeeding cycle that said fan is operative responsive in direct proportion to the difference between said actual temperature for said current cycle and said prescribed balance temperture.

6. The method according to claim 4 wherein step (e) is determined according to the following formula:

$$RT_{x+1} = (T_x - T_b) \times \frac{IN_x}{T_h - T_b}$$

where
- $RT_{x+1}$ = the run time for the succeeding cycle.
- $T_x$ = average temperature of the current cycle.
- $T_b$ = the prescribed balance temperature.
- $IN_x$ = the selected cycle interval.
- $T_h$ = the high temperature limit.

7. The method according to claim 6 wherein the determination in step (e) is made by assuming various hypothetical actual temperature values, solving substantially in accordance with said formula, storing said actual temperature values and fan run times for the succeeding cycle in a look-up schedule associated with said computer, and controlling said fan run times by delivering a sensed actual temperature to said computer from which the succeeding cycle fan run time is obtained.

8. The method according to claim 5 in which said served zone comprises a plurality of separate zones all served by the same supply fan and said actual temperature in the served zones is the average sensed actual temperature from each of said plurality of separate zones.

* * * * *